(12) United States Patent
Ramsay

(10) Patent No.: US 10,397,488 B2
(45) Date of Patent: *Aug. 27, 2019

(54) SMART SHUTTER IN LOW LIGHT

(71) Applicant: GoPro, Inc., San Mateo, CA (US)

(72) Inventor: Camden Ramsay, Santa Rosa, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/831,368

(22) Filed: Dec. 4, 2017

(65) Prior Publication Data
US 2018/0234604 A1 Aug. 16, 2018

Related U.S. Application Data

(63) Continuation of application No. 15/347,920, filed on Nov. 10, 2016, now Pat. No. 9,866,759, which is a (Continued)

(51) Int. Cl.
G06K 9/00 (2006.01)
G06T 7/20 (2017.01)
(Continued)

(52) U.S. Cl.
CPC ....... H04N 5/2352 (2013.01); G06K 9/00228 (2013.01); G06T 7/20 (2013.01);
(Continued)

(58) Field of Classification Search
CPC .............. G06F 3/0227; H04N 1/00204; H04N 1/32128; H04N 1/32662; H04N 1/32683;
(Continued)

(56) References Cited

U.S. PATENT DOCUMENTS 5,999,215 A 12/1999 Tamura
6,806,905 B1 * 10/2004 Morimoto .............. G01C 11/00
348/141

(Continued)

OTHER PUBLICATIONS

PCT International Search report and Written Opinion for PCT/US2016/055232, dated Dec. 5, 2016, 13 Pages.

Primary Examiner — Amy R Hsu
(74) Attorney, Agent, or Firm — Young Basile Hanlon & MacFarlane, P.C.

(57) ABSTRACT

A method is disclosed for improving the quality of photographs taken in low-light conditions by adjustment of shutter speed and digital gain based on a shutter prioritization value. Using a network of sensor, a digital camera processes various parameters, such as luminance of the scene and movement of the camera or of subjects within the scene, to compute a shutter prioritization value. The value is then used to select the most appropriate shutter speed and digital gain combination from a constant exposure curve. Higher prioritization values correspond to faster shutter speeds and higher digital gain. Lower prioritization values correspond to lower shutter speeds and lower digital gain. In further embodiments, the shutter prioritization value may be manually customized by a user in order to produce artistic effects.

20 Claims, 4 Drawing Sheets

Related U.S. Application Data continuation of application No. 14/879,078, filed on Oct. 8, 2015, now Pat. No. 9,571,741.

(51) Int. Cl.
  *H04N 5/14* (2006.01)
  *H04N 5/232* (2006.01)
  *H04N 5/235* (2006.01)

(52) U.S. Cl.
  CPC ........... *H04N 5/144* (2013.01); *H04N 5/2351* (2013.01); *H04N 5/2353* (2013.01); *H04N 5/23216* (2013.01); *H04N 5/23219* (2013.01); *H04N 5/23251* (2013.01); *G06T 2207/10016* (2013.01); *G06T 2207/30201* (2013.01)

(58) Field of Classification Search
  CPC ..... H04N 2201/001; H04N 2201/0046; H04N 2201/0084; H04N 2201/325; H04N 2201/3277; H04N 5/23293; H04N 5/2352; H04N 5/765
  See application file for complete search history.

(56) References Cited

U.S. PATENT DOCUMENTS

| | | | |
|---|---|---|---|
| 7,046,280 B1* | 5/2006 | Niikawa | G06F 3/0227 348/207.1 |
| 2004/0090532 A1* | 5/2004 | Imada | H04N 5/23209 348/208.16 |
| 2004/0169736 A1* | 9/2004 | Rakvica | H04N 1/00326 348/222.1 |
| 2005/0128343 A1 | 6/2005 | Murata | |
| 2005/0248660 A1* | 11/2005 | Stavely | G03B 39/00 348/208.16 |
| 2006/0008267 A1 | 1/2006 | Kim | |
| 2007/0092244 A1 | 4/2007 | Pertsel | |
| 2008/0049122 A1 | 2/2008 | Meguro | |
| 2008/0204564 A1 | 8/2008 | Yumiki | |
| 2008/0204565 A1* | 8/2008 | Yumiki | H04N 5/23219 348/208.99 |
| 2009/0185055 A1* | 7/2009 | Ono | H04N 5/23245 348/234 |
| 2010/0045819 A1* | 2/2010 | Pillman | H04N 5/235 348/226.1 |
| 2010/0073515 A1 | 3/2010 | Conard | |
| 2010/0188526 A1* | 7/2010 | Origuchi | H04N 5/2351 348/229.1 |
| 2013/0027581 A1* | 1/2013 | Price | H04N 5/2351 348/229.1 |
| 2013/0113950 A1* | 5/2013 | Park | G06T 5/50 348/208.4 |
| 2013/0141525 A1* | 6/2013 | Williams | H04N 7/00 348/38 |
| 2014/0263960 A1* | 9/2014 | Tatsuzawa | H04N 5/3532 250/208.1 |
| 2015/0062412 A1 | 3/2015 | Kasai | |
| 2015/0062413 A1 | 3/2015 | Yokoya | |
| 2015/0062414 A1 | 3/2015 | Hirasawa | |
| 2015/0253198 A1* | 9/2015 | Bergen | G06K 9/00825 250/206.1 |
| 2016/0227091 A1 | 8/2016 | Miura | |
| 2016/0295107 A1 | 10/2016 | Kinoshita | |

* cited by examiner

SMART SHUTTER IN LOW LIGHT

CROSS REFERENCE TO RELATED APPLICATIONS

This application is a continuation of U.S. application Ser. No. 15/347,920, filed Nov. 10, 2016, now U.S. Pat. No. 9,866,759, which is a continuation of U.S. application Ser. No. 14/879,078, filed Oct. 8, 2015, now U.S. Pat. No. 9,571,741, which is incorporated by reference in its entirety.

BACKGROUND

Technical Field

This disclosure relates to digital camera systems, and more specifically, to optimization of shutter speed for improved performance in low-light situations.

Description of the Related Art

Nearly all digital cameras available today automatically configure a multitude of photo capture parameters in order to optimize photographic performance. These parameters include shutter speed, digital gain (ISO), and aperture size. In order to configure these parameters, the camera processes sensory information gathered from a variety of sensors—including accelerometers and gyroscopes that measure motion of the camera and light sensors that measure the luminance of a scene. In most cases, a single auto-exposure (AE) algorithm, which is executing continuously on the camera, integrates and processes this and other sensor information and optimizes each of the photo capture parameters at the time of photo capture.

Standard auto-exposure algorithms typically produce high-quality results when a scene is sufficiently illuminated. Examples include professional photo shoots, outdoor daytime shooting, and indoor shooting with artificial light. However, in low-light situations, especially when either the camera or objects in the scene are in motion, auto-exposure algorithms often fail to produce high-quality results. Photos are often too dark, too grainy, or too blurry.

BRIEF DESCRIPTIONS OF THE DRAWINGS

The disclosed embodiments have other advantages and features which will be more readily apparent from the following detailed description of the invention and the appended claims, when taken in conjunction with the accompanying drawings, in which:

Figure (or "FIG.") 1 illustrates an example of a camera in accordance with one embodiment.

DETAILED DESCRIPTION

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

A digital camera measures the level of luminance of a scene. The camera determines if the measured luminance is below a predefined luminance threshold. If not, the camera applies a default shutter speed and default digital gain. If is the measured luminance is below the predefined threshold, the camera then determines if motion in excess of a predefined motion threshold is present, whether of objects in the scene or of the camera itself. If the camera determines that motion is not in excess of a predefined threshold, the camera applies a default shutter speed and digital gain. If the camera determines that motion is in excess of the motion threshold, the camera applies an adjusted shutter speed and digital gain. The adjusted shutter speed and digital gain are chosen to produce the same exposure as if the default shutter speed and digital gain were applied.

Example Camera Configuration

Figure 1:
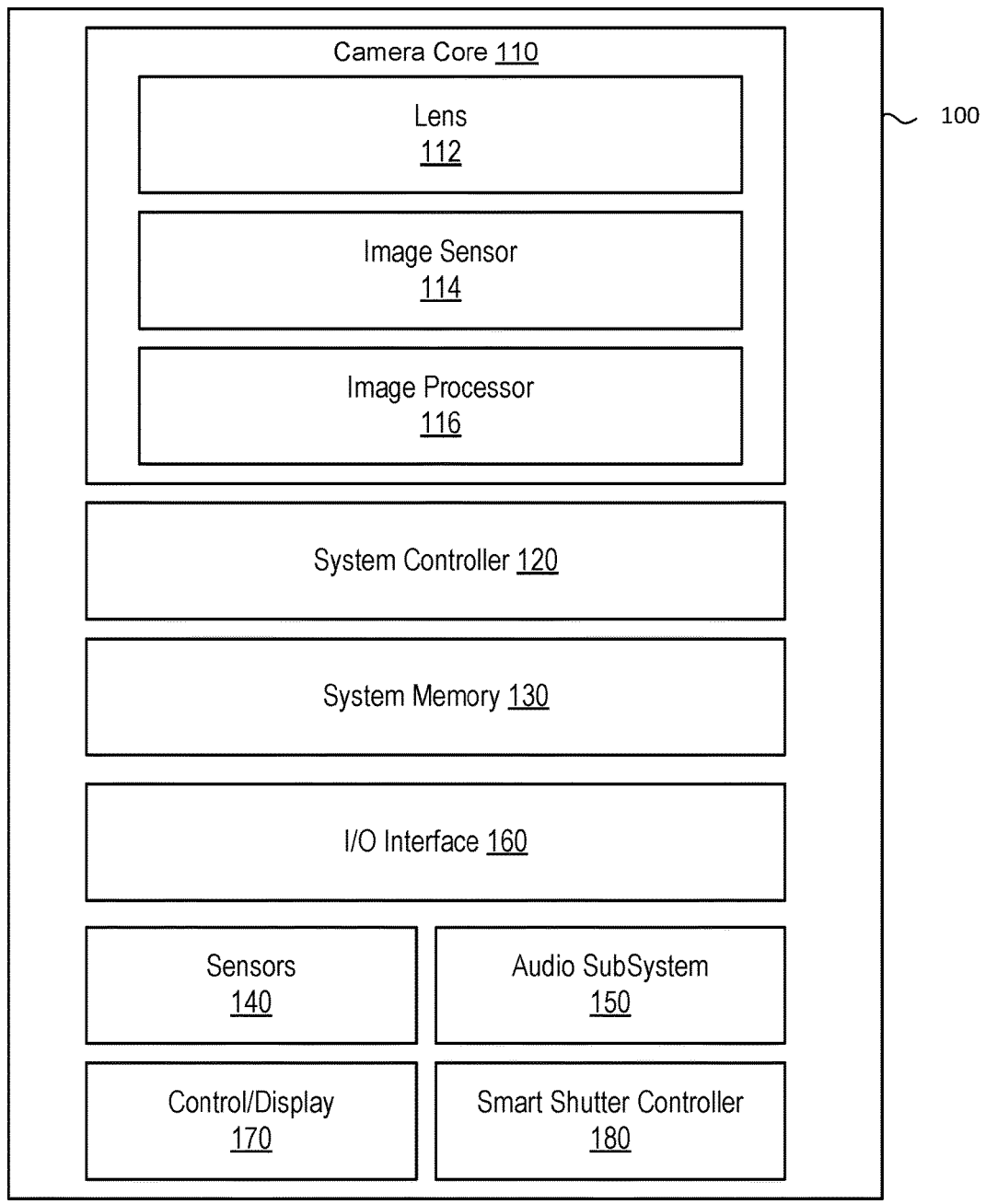

FIG. 1 is a block diagram illustrating a camera 100, according to one embodiment. In the illustrated embodiment, the camera 100 comprises a camera core 110 comprising a lens 112, an image sensor 114, and an image processor 116. The camera 100 additionally includes a system controller 120 (e.g., a microcontroller or microprocessor) that controls the operation and functionality of the camera 100 and system memory 130 configured to store executable computer instructions that, when executed by the system controller 120 and/or the image processors 116, perform the camera functionalities described herein. In some embodiments, a camera 100 may include multiple camera cores 110 to capture fields of view in different directions which can then be stitched together to form a cohesive image. For example, in an embodiment of a spherical camera system, the camera 100 may include two camera cores 110 each having a hemispherical or hyper-hemispherical lens that each captures a hemispherical or hyper-hemispherical field of view, which is stitched together in post-processing to form a spherical image.

The lens 112 can be, for example, a wide angle lens, hemispherical, or hyper-hemispherical lens that focuses light entering the lens to the image sensor 114 which captures images and/or video frames. The image sensor 114 may capture high-definition images having a resolution of, for example, 720 p, 1080 p, 4 k, or higher. For video, the image sensor 114 may capture video at frame rates of, for example, 30 frames per second, 60 frames per second, or higher. The image processor 116 performs one or more image processing functions of the captured images or video. For example, the image processor 116 may perform a Bayer transformation, demosaicing, noise reduction, image sharpening, image stabilization, rolling shutter artifact reduction, color space conversion, compression, or other in-camera processing functions. Processed images and video may be temporarily or persistently stored to system memory 330 and/or to a non-volatile storage, which may be in the form of internal storage or an external memory card.

An input/output (I/O) interface 160 transmits and receives data from various external devices. For example, the I/O interface 160 may facilitate the receiving or transmitting video or audio information through an I/O port. Examples of I/O ports or interfaces include USB ports, HDMI ports, Ethernet ports, audio ports, and the like. Furthermore, embodiments of the I/O interface 160 may include wireless ports that can accommodate wireless connections to the peripheral device or other devices. Examples of wireless ports include Bluetooth, Wireless USB, Near Field Communication (NFC), and the like. The I/O interface 160 may also include an interface to synchronize the camera 100 with other cameras or with other external devices, such as a smart phone, a client device, or a video server.

A control/display subsystem 170 includes various control and display components associated with operation of the camera 100 including, for example, LED lights, a display, buttons, microphones, speakers, and the like. The audio subsystem 150 includes, for example, one or more microphones and one or more audio processors to capture and process audio data correlated with video capture. In one embodiment, the audio subsystem 150 includes a microphone array having two or microphones arranged to obtain directional audio signals.

Sensors 140 capture various metadata concurrently with, or separately from, video capture. For example, the sensors 140 may capture time-stamped location information based on a global positioning system (GPS) sensor, and/or an altimeter. Other sensors 140 may be used to detect and capture orientation of the camera 100 including, for example, an orientation sensor, an accelerometer, a gyroscope, or a magnetometer. Sensor data captured from the various sensors 140 may be processed to generate other types of metadata. For example, sensor data from the accelerometer may be used to generate motion metadata, comprising velocity and/or acceleration vectors representative of motion of the camera 100. Furthermore, sensor data from the may be used to generate orientation metadata describing the orientation of the camera 100. Sensor data from the GPS sensor provides GPS coordinates identifying the location of the camera 100, and the altimeter measures the altitude of the camera 100. In one embodiment, the sensors 140 are rigidly coupled to the camera 100 such that any motion, orientation or change in location experienced by the camera 100 is also experienced by the sensors 140. The sensors 140 furthermore may associate a time stamp representing when the data was captured by each sensor. In one embodiment, the sensors 140 automatically begin collecting sensor metadata when the camera 100 begins recording a video.

A smart shutter controller 180 adjusts shutter speed and digital gain of the digital camera in order to optimize quality of photos taken in low-light conditions, especially those involving motion. In one embodiment, the smart shutter controller 180 can be implemented as a hardware component. In another embodiment, the smart shutter controller 180 can be implemented as a non-transitory computer-readable storage medium executed on a processor contained in the digital camera. In alternative embodiments, the smart shutter controller 180 may not be configured as a discrete hardware or software component; instead, its functions could be performed in whole or in part by other illustrated components such as the image processor 116 or system controller 120.

Adjusting Shutter Speed and Gain

In order to maximize photo quality in low-light conditions, the camera 100 balances two photographic parameters: shutter speed and digital gain (also known as ISO). Faster shutter speeds—in other words, when the shutter of the camera is open for a relatively short period of time—helps to reduce blurring, either due to movement of objects in the scene of the photo or due to movement or vibration of the camera. However, in order to ensure adequate exposure, the camera may compensate by increasing digital gain. A tradeoff associated with increased digital gain is that it may introduce more noise and cause the captured image to look grainier.

Conversely, lower digital gain generally produces better dynamic range and less noise, but may result in images that lack sufficient luminance unless applied together with sufficiently low shutter speeds (longer shutter durations). As described previously, low shutter speeds may be undesirable in situations where motion is present in the scene, or if the camera 100 is moving relative to the scene, because moving objects will appear blurred.

The performance trade-off between shutter speed and digital gain can be optimized via a shutter priority mechanism that influences shutter speed based on photographic conditions.

Constant Exposure Curve

For each photograph, shutter speed and digital gain act together to determine how much light is incident on the light-capturing digital sensor of a camera. This is referred to as exposure, which can be described quantitatively by an exposure value (EV). Different combinations of shutter speed and digital gain can produce a photograph with the same EV. A plot of all such combinations is known as a constant exposure curve.

The constant exposure curve plots combinations of shutter speed and digital gain for which the camera would produce the same exposure. Auto-Exposure (AE) algorithms standard on most digital cameras are designed to select a default point on the constant exposure curve based on the size of the camera's aperture and luminance of the scene, measured by a brightness sensor in the camera. The intent of the shutter priority mechanism is to adjust this default selection in order to produce better photographs when the camera is operating in low-light conditions, especially when subjects and/or the camera are in motion.

In camera embodiments in which no shutter priority mechanism is implemented, the relationship between the photographic parameters relevant to photo capture can be described by the following relation:

$$\log_2(y) + \log_2(a) = \log_2(l) + \log_2(0.32(g))$$

In the above relation, y is the reciprocal of the shutter speed in seconds, l is the luminance of the scene measured in foot-lamberts, g is the digital gain (ISO) of the camera, and a is the aperture size of the camera, expressed as an f-stop number.

The shutter priority mechanism is implemented by means of a shutter prioritization value that manages the trade-off between shutter speed and digital gain along the constant exposure curve. The shutter prioritization value is a scalar multiplier that causes the shutter speed and digital gain to be increased and decreased uniformly. A modified version of the previously described relation, expressed below, illustrates the effect of the shutter prioritization value:

$$\log_2(y^*x) + \log_2(a) = \log_2(l) + \log_2(0.32(g^*x))$$

In the above relation, y*x and g*x represent the adjusted reciprocal of the shutter speed and the adjusted digital gain, respectively. Setting x=1 results in a default shutter speedy and digital gain g (e.g., the shutter speed and digital gain that may be selected by a conventional auto-exposure algorithm). Values of x greater than one therefore produce faster shutter speeds and higher digital gain relative to the default values. This adjustment generally offers better camera performance in low-light situations where motion is present by reducing blurring of moving objects while still producing an acceptable exposure. Values of x less than one produce slower shutter speeds and lower digital gain relative to the default values. Such an adjustment may be desirable to minimize noise in cases where no motion or very low motion is present.

Figure 2:
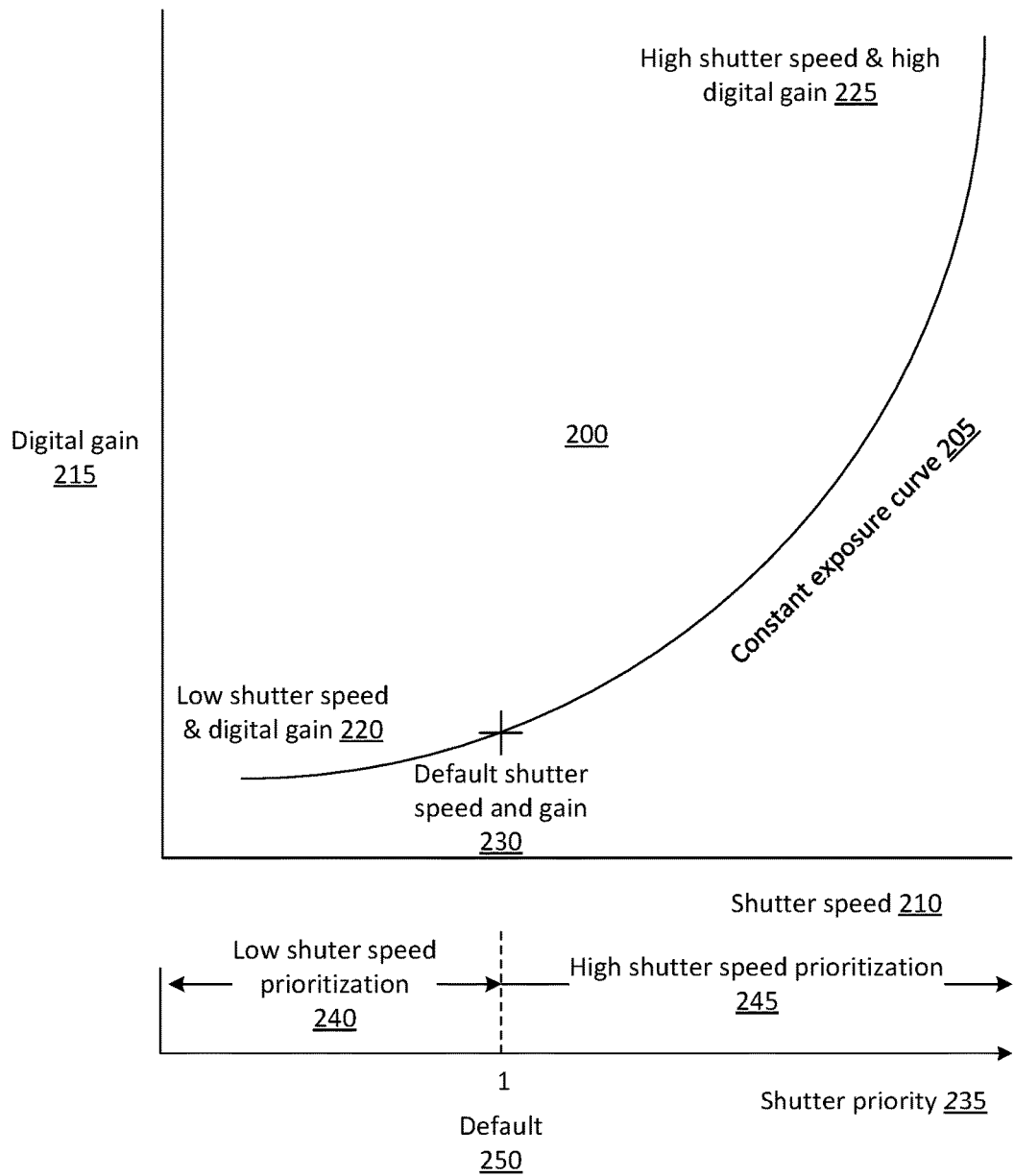
FIG. 2 is a flowchart illustrating a process for controlling shutter and gain of a digital camera based on detection of a low-light environment and/or detection of camera or scene movement, according to one embodiment.

FIG. 2 illustrates the relationship between a shutter prioritization value and a typical exposure-value (EV) curve, according to one embodiment. The constant exposure curve 205 relates shutter speed 210 and digital gain 215. The constant exposure curve 205 ranges between two extremes, with low shutter speed and digital gain 220 at one end and high shutter speed and high digital gain 225 at another. One point on the constant exposure curve 205 is marked with a crosshair and is considered the default shutter speed and digital gain 230. In typical embodiments, an auto-exposure algorithm executing on a digital camera without shutter prioritization would select the default shutter speed and digital gain setting 230.

As previously described, selection of a shutter speed and a digital gain setting from the constant exposure curve 205 is influenced by the shutter prioritization value. The shutter prioritization value is mapped onto a number line 235, which is divided into two segments. Each segment is labeled with its corresponding effect on camera behavior. A shutter prioritization value between 0 and 1 corresponds to low prioritization of shutter speed 240 in which the shutter speed and digital gain are reduced relative to the default values selected by a conventional auto-exposure algorithm. A shutter prioritization value greater than 1 corresponds to a high prioritization of shutter speed 245 in which the shutter speed and digital gain are raised relative to the default values selected by a conventional auto-exposure algorithm. A shutter prioritization value equal to 1 corresponds to the default shutter speed and gain setting 250, marked by the crosshair on the constant exposure curve 205.

Decision Flow for Smart Shutter Control

Figure 3:
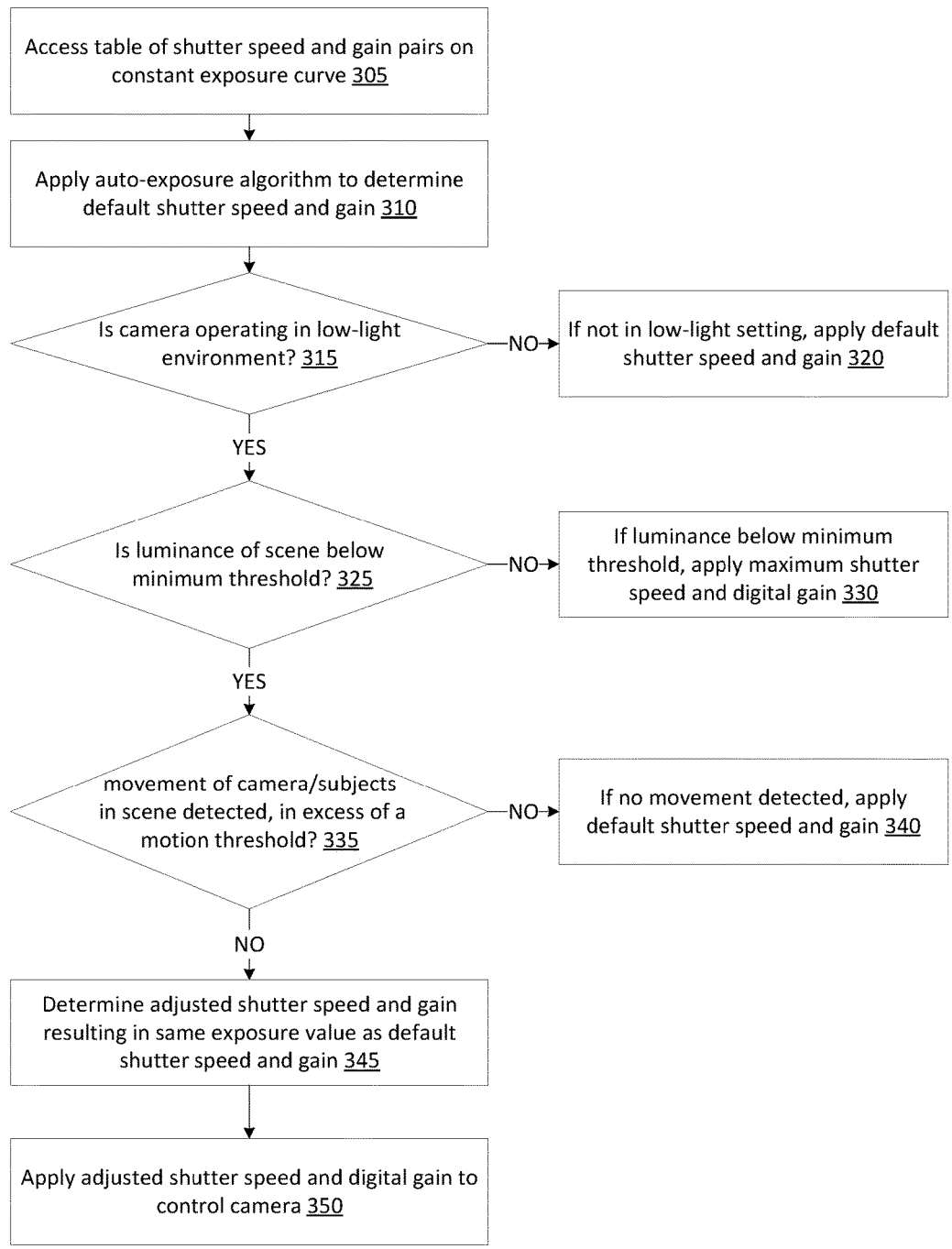
FIG. 3 is a graph illustrating a relationship between a shutter prioritization value and a typical exposure-value (EV) curve, according to one embodiment.

FIG. 3 is a flowchart illustrating a process for adjusting shutter speed and digital gain of a digital camera based on detection of a low-light environment and/or detection of movement of objects in the scene and/or of the camera itself, according to one embodiment. The camera applies 310 an auto-exposure algorithm to determine an appropriate exposure value or a default shutter speed and digital gain pair corresponding to the exposure value. In typical embodiments, the auto-exposure algorithm determines the brightness of the scene by measuring the magnitude of ambient light. A smart shutter controller 180 of the digital camera determines 315 if the camera is operating in a low-light environment. For example, the smart shutter controller 180 determines if the ambient light entering the image sensor is below a threshold luminance value. This determination may be made based on the exposure value determined by the auto-exposure algorithm. If the camera is not operating in the low-light environment (e.g., the light entering the image sensor is above the threshold luminance value), the smart shutter controller 180 applies 320 a default shutter speed and digital gain for the level of exposure determined by the auto-exposure algorithm. If the camera is found to be operating in a low-light environment, the smart shutter controller 180 then determines 325 if the luminance of the scene is below a minimum threshold. If so, the camera applies 330 maximum digital gain and minimum shutter speed allowable by the camera 100 in order to maximize exposure. However, if luminance of the environment is not below a minimum threshold, the smart shutter controller 180 then determines 335 if movement of the camera or of objects within the scene is in excess of a motion threshold. If no movement in excess of a motion threshold is detected, the smart shutter 180 controller applies 340 the default shutter speed and digital gain. If movement in excess of a motion threshold is detected, the smart shutter controller 180 determines 345 an adjusted shutter speed and digital gain pair. Generally, in response to motion, the adjusted shutter speed and gain are increased relative to the default shutter speed and gain respectively and are selected to result in the same or substantially similar (e.g., within a threshold range) exposure value as the default shutter speed and digital gain pair initially selected by the auto-exposure algorithm. Finally, the smart shutter 180 controller applies 250 the adjusted shutter speed and digital gain pair to control the camera.

Motion Dependency of the Shutter Prioritization Value

A variety of sensory inputs are processed in order to determine the shutter speed and digital gain in step 345. Typical examples include movement data from accelerometers and gyroscopes, as well as the output of more sophisticated face tracking and motion detection algorithms. In particular, motion can take multiple forms and the camera may select different shutter and gain settings depending on the type of motion detected. In some embodiments, the subject of a photograph—such as a vehicle or airplane—may be moving at great speed relative to the camera, which is stationary. In another embodiment, the camera may be attached to a moving vehicle, while the subject of the photograph is stationary. Subject tracking algorithms may be employed to identify and measure the relative movement of subjects in the scene of the photo. In some embodiments, facial detection or face tracking algorithms may be used to identify and track human subjects if they are present in the scene. Finally, the camera itself—or a person operating the camera—may introduce shaking or jittering during the course of operation. For example, pressing a photo capture button may cause the camera to shake, resulting in motion relative to the scene and the subjects contained therein. Accelerometers or gyroscopes integrated into the camera body may be used to detect and measure any shake or jitter of the camera body.

Figure 4:
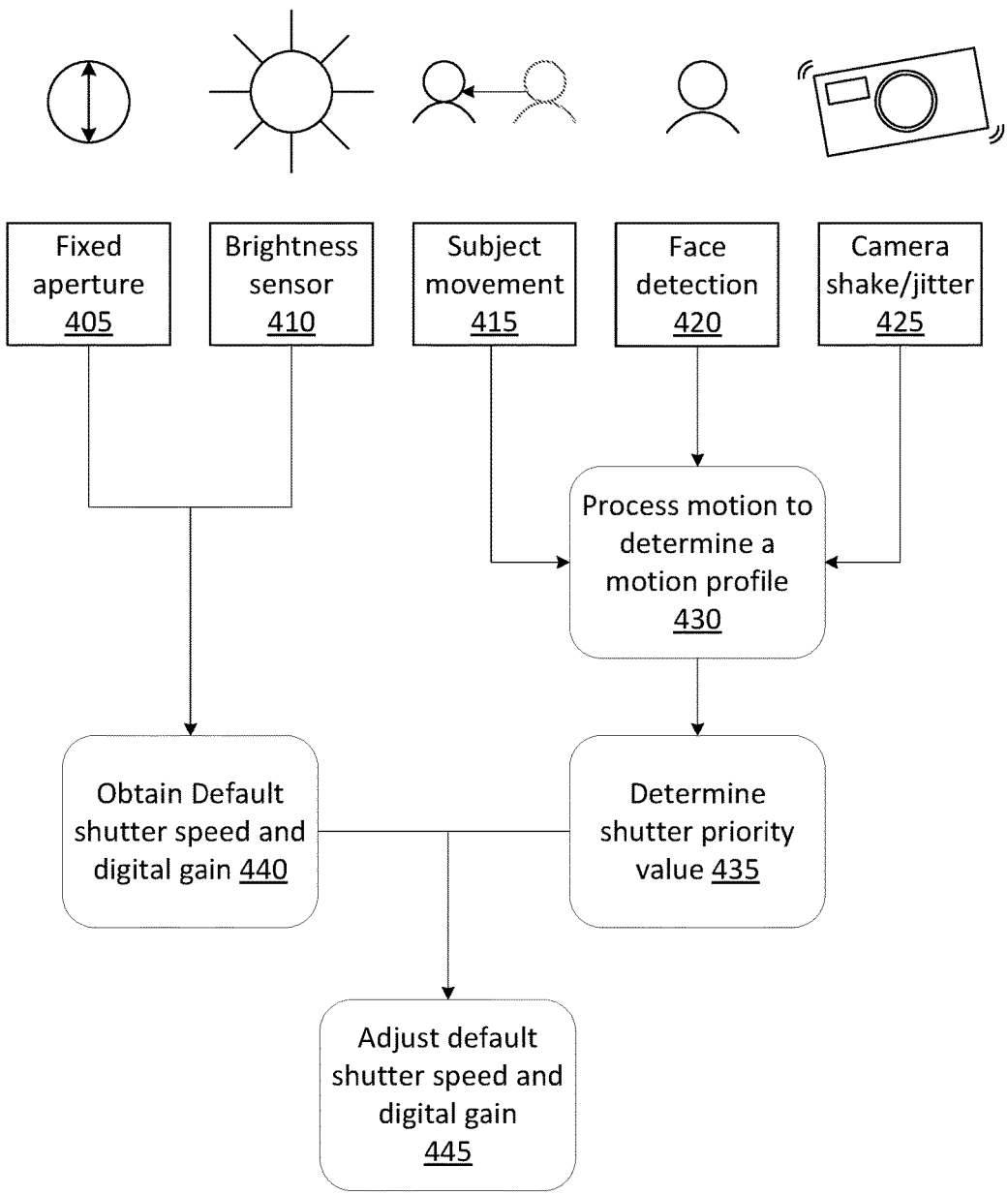
FIG. 4 is a flowchart illustrating a process for determining an optimized shutter speed and gain setting based on various input data, according to one embodiment.

FIG. 4 is a flowchart illustrating the process of selecting an adjusted shutter speed and digital gain based on processing of the type and magnitude of movement, according to one embodiment. A smart shutter controller 180 obtains 440 the default shutter speed and gain (or a corresponding exposure value) that will result in a properly exposed image given the size of an aperture 405 and luminance readings from a brightness sensor 410. In one embodiment, the aperture may be fixed, such that the aperture size can be treated as a constant. The smart shutter controller 180 records a plurality of movement-related inputs. In typical embodiments, this could include movement of a subject 415 within the scene of the camera (e.g., by performing motion analysis on the captured video), detection of a face 420 within the scene of the camera (e.g., by performing face detection), or detection of camera shake or jitter 425. The camera shake or jitter 425 may be determined via accelerometers or gyroscopes that detect motion of the camera. Furthermore, detecting a button press on the camera may automatically be treated as camera motion because it can be reasonably assumed that the camera will move in response to a button press. In practice, because the effect of camera movement on motion blur is more apparent at higher focal lengths, the focal length of the camera is recorded as well. One or more of these movement-related inputs is processed 430 to determine a motion profile which may include, for example, the type and magnitude of motion. The motion profile may describe the nature of motion in multiple ways. In one embodiment, the motion profile specifies an oscillation with a specified amplitude and frequency. The profile may also specify one or more qualitative properties, such as whether faces were detected in the scene.

In some implementations, profiles involving detection of one or more faces within the scene may receive additional processing in order to determine an optimum shutter speed. For example, face detection algorithms may determine the severity of camera shake by treating the one or more detected faces as reference objects and observing the relative change in the height of each face due to movement of the camera. Additionally, detected motion of the camera may be used to determine the shutter speed based on the amplitude of the detected motion and the focal length of the lens, where a longer focal length corresponds to a shorter shutter speed.

Based on this processing, the smart shutter controller 180 determines a shutter prioritization value 435. The shutter prioritization value is then applied to adjust 445 the default shutter speed and digital gain to a different shutter speed, gain pair on the constant exposure curve. For example, in one embodiment, the default shutter speed is multiplied by 1/x to obtain the adjusted shutter speed and the gain is multiplied by x to determine the adjusted gain, where x represents the shutter prioritization value. In another embodiment, a lookup table may be used to determine the adjusted shutter speed and gain based on the shutter prioritization value. In yet another embodiment, the shutter prioritization value need not be obtained explicitly and a lookup may be performed to determine the adjusted gain and shutter speeds based directly on the motion profile and the default exposure value or default gain and shutter speeds.

As one example, the table below illustrates an example of shutter prioritization values for different types and magnitudes of detection motion and illustrates the adjust shutter and adjusted gain in the example case where the default exposure results in a default shutter speed of 1/15 seconds and a default gain of 400:

| Example motion profile table for default exposure of (Shutter speed: 1/15 seconds, ISO: 400) | | | |
|---|---|---|---|
| Motion Profile: | Shutter Prioritization Value | Adjusted Shutter (seconds): | Adjusted Gain (ISO): |
| Face detected with high motion | 5 | 1/240 | 6400 |
| High Camera Movement detected | 4 | 1/120 | 3200 |
| Face detected with low motion | 4 | 1/120 | 3200 |
| Camera button press detected | 4 | 1/120 | 3200 |
| Low Camera Movement detected | 3 | 1/60 | 1600 |
| Multiple faces detected | 3 | 1/60 | 1600 |
| Not used | 2 | 1/30 | 800 |
| Default | 1 | 1/15 | 400 |
| Not used | 0.5 | 1/8 | 200 |
| Tripod mounted; Static scene | 0.25 | 1/4 | 100 |
| Not used | 0.125 | 1/2 | 50 |

In the table above, the motion profile "face detected with high motion" indicates that a face detection algorithm detects that a face is present in the video and that it is moving with relatively high motion (e.g., a above a predefined motion threshold). The motion profile "face detected with low motion" indicates that the face detection algorithm detects that a face is present in the video but it is moving with relatively low motion (e.g., below the predefined motion threshold). The motion profile "multiple faces detected" indicates that the face detection algorithm detects multiple different faces in the video regardless of the motion. The motion profile "high camera movement detected" indicates that the gyroscope or accelerometer in the camera detects relatively high camera movement (e.g., exceeding a predefined upper motion threshold). The motion profile "low camera movement detected" indicates that the gyroscope or accelerometer in the camera detects relatively low camera movement (e.g., exceeding a predefined lower motion threshold but below the predefined upper threshold). The profile "camera button press detected" indicates that a button press on the camera was detected. The profile "tripod mounted; static scene" indicates that the camera has detected that it is mounted to a tripod (and therefore assumed to be relatively stable) and the captured scene is substantially static (i.e., motion in the captured video is below a motion threshold). The motion profiles discussed above are exemplary in other embodiments, additional or different motion profiles may be defined.

Further Shutter Prioritization Methods

The shutter prioritization mechanism described in previous embodiments may be modified to offer advanced functionality to users. In an alternative embodiment, shutter prioritization may be restricted to a simple "on/off" scheme in which a digital camera maintains a first (e.g., default) shutter speed and digital gain combination under standard conditions, and switches to a second (e.g., adjusted) shutter speed and digital gain combination if it is operating in a low-light environment, and if motion of any kind is detected. This embodiment would require less processing power than the method described previously, in which a variety of shutter speed and gain combinations are accessible based on the magnitude of the shutter prioritization value.

In a preferred embodiment, the motion profile described above with reference to FIG. 4 may be used to access a look-up table containing discrete shutter speed values. These values may be chosen so as to completely eliminate blurring due to motion of the camera or of objects in the scene. In practice, the motion profile would be used as a key to the look-up table, along with a value describing the focal length of the camera. The use of a look-up table would allow the camera to arrive at an optimum shutter speed in a deterministic manner. Based on the chosen shutter speed, the camera could then optimize digital gain based on previously determined exposure constraints.

In another embodiment, a user may wish to produce an artistic effect by intentionally changing the shutter prioritization value. This could be implemented by configuring a control interface of the digital camera to allow for direct control of the shutter prioritization value. Then, in low-light situations that involve movement, a user may introduce blur or noise into his or her photos as desired.

In a further embodiment, a finite set of shutter speed and digital gain combinations, each corresponding to a single shutter prioritization value, may be labeled with descriptive terms and made available to a camera user for selection. For example, one particular shutter speed and digital gain combination, configured for photos of stationary human subjects in low light conditions, may be labeled "Face Detected, Stationary". Another shutter speed and digital gain combination, configured for photos of rapidly moving human subjects in low light conditions, may be labeled "Face Detected, High Speed". The intention of this embodiment would be to offer a user granular control of shutter prioritization, such that he or she can customize camera behavior based on their own understanding of the environment.

Throughout this specification, some embodiments have used the expression "coupled" along with its derivatives. The term "coupled" as used herein is not necessarily limited to two or more elements being in direct physical or electrical contact. Rather, the term "coupled" may also encompass two or more elements are not in direct contact with each other, but yet still co-operate or interact with each other, or are structured to provide a thermal conduction path between the elements.

Likewise, as used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Upon reading this disclosure, those of skill in the art will appreciate still additional alternative structural and functional designs as disclosed from the principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the scope defined in the appended claims.

The invention claimed is:

1. A method for controlling a digital camera, comprising:
   determining if motion meeting a predefined motion criteria is present in image frames captured by the digital camera;
   responsive to determining that the motion meeting the predefined motion criteria is not present in the image frames, controlling the digital camera to operate with a default shutter speed and a default digital gain; and
   responsive to determining that the motion meeting the predefined motion criteria is present in the image frames, controlling the digital camera to operate with an adjusted shutter speed and an adjusted digital gain, the adjusted shutter speed and the adjusted digital gain resulting in an exposure value that corresponds to the default shutter speed and the default digital gain.

2. The method of claim 1, further comprising:
   determining if a luminance level of light entering the digital camera is below a predefined luminance threshold;
   responsive to determining that the luminance level is not below the predefined luminance threshold, controlling the digital camera to operate with a default shutter speed and a default digital gain; and
   responsive to determining that the luminance level is below the predefined luminance threshold, controlling the digital camera to operate with the adjusted shutter speed and the adjusted digital gain, the adjusted shutter speed adjusted in a first direction from the default shutter speed and the adjusted digital gain adjusted in a second direction from the default digital gain, the second direction opposite the first direction.

3. The method of claim 1, wherein the adjusted shutter speed is adjusted in a first direction from the default shutter speed and the adjusted digital gain is adjusted in a second direction from the default digital gain, the second direction opposite the first direction.

4. The method of claim 1, wherein determining if the motion meeting the predefined motion criteria is present in the image frames comprises:
   determining any of lateral movement of the digital camera with respect to a scene, movement of a subject in the scene with respect to the digital camera, shake of the digital camera, jitter of the digital camera, and rotation of the digital camera.

5. The method of claim 1, wherein determining if the motion meeting the predefined motion criteria is present in the image frames comprises:
   applying a face detection analysis to one or more captured images to detect a location of a face in each of the one or more captured images; and
   determining if movement of the location of the face between the one or more captured images meets the predefined motion criteria.

6. The method of claim 1, wherein determining if the motion meeting the predefined motion criteria is present in the image frames comprises:
   obtaining sensor data from any of a gyroscope and accelerometer embedded in the digital camera;
   determining if motion of the digital camera indicated by the obtained sensor data meets the predefined motion criteria.

7. The method of claim 1, wherein determining if the motion meeting the predefined motion criteria is present in the image frames comprises:
- determining if the digital camera is being operated by any of a shutter button on the digital camera and a remote control device.

8. The method of claim 2, further comprising:
- determining if the luminance level is below a second threshold lower than the predefined luminance threshold; and
- responsive to determining that the luminance level is below the second threshold, controlling the digital camera to operate with a slowest allowable shutter speed and maximum allowable digital gain.

9. The method of claim 1, wherein controlling the digital camera to operate with the adjusted shutter speed and the adjusted digital gain comprises:
- determining a characteristic of the motion meeting the predefined motion criteria, the characteristic being at least one of a type of the motion and a magnitude of the motion;
- generating a shutter prioritization value depending on the characteristic;
- multiplying the default shutter speed by a reciprocal of the shutter prioritization value to generate the adjusted shutter speed; and
- multiplying the default digital gain by the shutter prioritization value to generate the adjusted digital gain.

10. The method of claim 1, wherein controlling the digital camera to operate with the adjusted shutter speed and the adjusted digital gain comprises:
- determining a characteristic of the motion meeting the predefined motion criteria, the characteristic being at least one of a type of the motion and a magnitude of the motion;
- generating a shutter prioritization value depending on the characteristic; and
- performing a lookup in a lookup table mapping the shutter prioritization value to one of a predefined pair of shutter speed and digital gain values that each result in a same exposure value.

11. The method of claim 10, wherein determining the characteristic of the motion meeting the predefined motion criteria comprises:
- determining that the motion includes a first motion type responsive to determining that the digital camera is being operated without a remote control device;
- determining that the motion includes a second motion type responsive to determining movement of one or more faces in one or more captured images; and
- determining that the motion includes a third motion type responsive to sensor data from an on-board sensor indicating motion of the digital camera.

12. A non-transitory computer-readable storage medium storing instructions for controlling a digital camera, the instructions when executed by a processor causing the processor to perform steps including:
- determining if motion meeting a predefined motion criteria is present in image frames captured by the digital camera;
- responsive to determining that the motion meeting the predefined motion criteria is not present in the image frames, controlling the digital camera to operate with a default shutter speed and a default digital gain; and
- responsive to determining that the motion meeting the predefined motion criteria is present in the image frames, controlling the digital camera to operate with an adjusted shutter speed and an adjusted digital gain, the adjusted shutter speed and the adjusted digital gain resulting in an exposure value that corresponds to the default shutter speed and the default digital gain.

13. The non-transitory computer-readable storage medium of claim 12, wherein determining if the motion meeting the predefined motion criteria is present in the image frames comprises:
- determining any of lateral movement of the digital camera with respect to a scene, movement of a subject in the scene with respect to the digital camera, shake of the digital camera, jitter of the digital camera, and rotation of the digital camera.

14. The non-transitory computer-readable storage medium of claim 12, wherein determining if the motion meeting the predefined motion criteria is present in the image frames comprises:
- applying a face detection analysis to one or more captured images to detect a location of a face in each of the one or more captured images; and
- determining if movement of the location of the face between the one or more captured images meets the predefined motion criteria.

15. The non-transitory computer-readable storage medium of claim 12, wherein determining if the motion meeting the predefined motion criteria is present in the image frames comprises:
- obtaining sensor data from any of a gyroscope and accelerometer embedded in the digital camera;
- determining if motion of the digital camera indicated by the obtained sensor data meets the predefined motion criteria.

16. The non-transitory computer-readable storage medium of claim 12, wherein determining if the motion meeting the predefined motion criteria is present in the image frames comprises:
- determining if the digital camera is being operated by any of a shutter button on the digital camera and a remote control device.

17. The non-transitory computer-readable storage medium of claim 12, wherein controlling the digital camera to operate with the adjusted shutter speed and the adjusted digital gain comprises:
- determining a characteristic of the motion meeting the predefined motion criteria, the characteristic being at least one of a type of the motion and a magnitude of the motion;
- generating a shutter prioritization value depending on the characteristic;
- multiplying the default shutter speed by a reciprocal of the shutter prioritization value to generate the adjusted shutter speed; and
- multiplying the default digital gain by the shutter prioritization value to generate the adjusted digital gain.

18. The non-transitory computer-readable storage medium of claim 12, wherein controlling the digital camera to operate with the adjusted shutter speed and the adjusted digital gain comprises:
- determining a characteristic of the motion meeting the predefined motion criteria, the characteristic being at least one of a type of the motion and a magnitude of the motion;
- generating a shutter prioritization value depending on the characteristic; and performing a lookup in a lookup table mapping the shutter prioritization value to one of a predefined pair of shutter speed and digital gain values that each result in a same exposure value.

19. A camera comprising:
an image sensor to capture image frames from light entering the camera;
a lens assembly to direct the light entering the camera to the image sensor;
a shutter controllable to pass the light to the lens assembly when the shutter is open and to block the light from entering the lens assembly when the shutter is closed;
a processor; and
a non-transitory computer-readable storage medium storing instructions that when executed by the processor cause the processor to perform steps including:
   determining if motion meeting a predefined motion criteria is present in image frames captured by the digital camera;
   responsive to determining that the motion meeting the predefined motion criteria is not present in the image frames, controlling the digital camera to operate with a default shutter speed and a default digital gain; and
   responsive to determining that the motion meeting the predefined motion criteria is present in the image frames, controlling the digital camera to operate with an adjusted shutter speed and an adjusted digital gain, the adjusted shutter speed and the adjusted digital gain resulting in an exposure value that corresponds to the default shutter speed and the default digital gain.

20. The camera of claim 19, further comprising:
a motion sensor to detect the motion based on movement of the digital camera while capturing the image frames.

* * * * *